United States Patent [19]

Barrington

[11] Patent Number: 4,810,379
[45] Date of Patent: Mar. 7, 1989

[54] FILTER FOR DRY CLEANING SOLVENT

[76] Inventor: Ross B. Barrington, 20 Ringshall, Little Gaddesden, Nr. Berkhamsted, Herts HP4 1ND, England

[21] Appl. No.: 29,262

[22] Filed: Mar. 23, 1987

[30] Foreign Application Priority Data

Mar. 26, 1986 [GB] United Kingdom ................ 8607513

[51] Int. Cl.[4] ...................... B01D 27/06; B01D 27/08
[52] U.S. Cl. .................................... 210/232; 210/264; 210/266; 210/282; 210/450; 210/455; 210/457; 210/493.1; 210/497.01; 55/498; 55/500; 55/502; 55/521
[58] Field of Search ............... 210/232, 238, 266, 264, 210/282, 450, 455, 457, 493.1, 493.4, 494.1, 497.01; 55/497, 498, 500, 502, 511, 520, 521, 529

[56] References Cited

U.S. PATENT DOCUMENTS

| | | | |
|---|---|---|---|
| 3,675,776 | 7/1972 | Campo | 210/232 |
| 3,868,325 | 2/1975 | Otto | 210/232 |
| 3,920,553 | 11/1975 | Cilenta | 210/232 |
| 3,954,618 | 5/1976 | Strauss | 210/232 |
| 4,065,392 | 12/1977 | Gammon | 210/282 |
| 4,138,337 | 2/1979 | Smith | 210/282 |
| 4,212,739 | 7/1980 | Hilton et al. | 210/232 |
| 4,302,330 | 11/1981 | Cusato, Jr. | 210/232 |
| 4,310,419 | 1/1982 | Nara et al. | 55/521 |
| 4,320,005 | 3/1982 | De Graffenreid | 210/232 |
| 4,422,790 | 12/1983 | Gebert et al. | 210/232 |
| 4,640,779 | 2/1987 | Taki et al. | 210/493.5 |
| 4,680,118 | 7/1987 | Taga | 55/498 |
| 4,710,297 | 12/1987 | Suzuki et al. | 55/521 |

FOREIGN PATENT DOCUMENTS

| | | |
|---|---|---|
| 2616954 | 2/1977 | Fed. Rep. of Germany . |
| 1093100 | 11/1967 | United Kingdom . |
| 1340490 | 12/1973 | United Kingdom . |
| 2154894 | 9/1985 | United Kingdom . |

Primary Examiner—Richard V. Fisher
Assistant Examiner—Wanda L. Millard
Attorney, Agent, or Firm—Jeffers, Hoffman & Niewyk

[57] ABSTRACT

A filter unit (1) has an annular pleated paper filter element (9) the pleats of which are sealed at their end edges (92) to define inwardly opening pockets. Consequently, gaskets (8) need only seal the radially innermost periphery of each end of the filter element (9), and end plates (4,5) supporting the gaskets (8) may be given a smaller diameter than the element (9).

12 Claims, 3 Drawing Sheets

FILTER FOR DRY CLEANING SOLVENT

This invention relates to filters for cleaning dirty solvent in a dry cleaning process to enable the cleaned solvent to be reused.

At the present time, dry cleaning machines are provided with a cylindrical filter housing in which the dirty solvent passes radially inwards through an annular filter unit positioned around a perforate collection tube, which collects the cleaned solvent and carries it axially out of the chamber, and which is also usually used as a tie bar for tightening end walls of the housing into sealing engagement with end plates of the filter unit. Generally, the filter unit is an integral cartridge unit, which is thrown away after use, and which comprises an annular pleated paper element surrounding a perforate tubular core with their ends embedded in or crimped into end plates attached to the ends of the core. Secure sealing between the end plates and the full radial width of the annular pleated element is necessary to avoid solvent bypass over the end edges of the pleats. The end plates have central holes so that the cartrige may be slid over the collection tube when being positioned in the filter housing.

Some filter units are provided with a bed of activated carbon granules (which remove very fine particles such as colored dyes) and/or activated clay granules (which absorb contaminants such as fatty acids). This bed is either provided between the perforate core and paper element, or between the perforate core and a second perforate tubular core and/or annular pleated paper element positioned radially inwardly of the first perforate core. The second core or element would also be embedded in the end plates.

Once the filter cartridge has been slid over the collection tube, a cover plate, forming an end wall of the housing, is used to seal the housing. When a pleated filter element (usually the outer one), or the filter bed, has become saturated, it is necessary to change the filter cartridge for a new one. Disposal of the old filter cartridge involves problems. Thus it will retain solvents which are potentially hazardous and the cylindrical cartridge is bulky and space-consuming. Furthermore, every time a cartridge is disposed of, it is necessary, as a result of the filter having an integral construction, to dispose of the perforate core and end plates at the same time.

Also, it has been found that almost invariably it is the outer pleated element which becomes saturated before the filter bed and, accordingly, the filter bed is disposed of before the end of its useful service life. Some dry cleaning plants have a separate pre-filter unit positioned upstream of the main filter unit so as to lengthen the life of the main pleated element to that of the filter bed, but this modification requires capital expenditure and results in a more complicated operating procedure.

In recognition of these problems, an alternative to the integral filter cartridge has been proposed, but not found acceptable in the industry, in the form of a reusable filter element support which comprises a perforate core with end plates, one of which is removable to allow one or more annular pleated paper elements to be slid over the core before the end plate is resecured. The assembled filter unit is then used in the machine as normal. Prior to use, activated granules may be poured, in loose form, into the annular void between the perforate core and collection tube. However, it has been found that the messy task of pouring in the granules, and removing them when saturated, has discouraged operators from adhering to this part of the recommended method of use, and consequently problems have arisen. Furthermore, the pleated elements have caused a major problem as they are floppy and difficult to manipulate into position. Also, they cannot be embedded in or crimped to the end plates. They have therefore merely been able to rest against the end plates in the hope that, with the provision of a gasket, bypass flow of solvent around their end edges can be discouraged. Even so, sealing along the full length of the edges is difficult and the pressure drop across the paper element inevitably allows some solvent to take the path of least resistance and flow around the end edges and, consequently, a proportion of the solvent is not cleaned properly. A similar leakage flow occurs when two or more elements are held between the end plates and disk-like gaskets are provided between the elements in an attempt to prevent the unwanted leakage.

Filter units used in the dry cleaning process are unusually large for units which use pleated paper elements, being typically 100 mm or more in diameter, and up to 300 mm in length. We have introduced the use of two or more short units instead of one long unit since problems arise owing to dirt building up between the periphery of the unit and the housing wall. It is easier to pull out separately short units instead of attempting to overcome the friction binding of a long unit. When filter units are used in a stacked arrangement in a housing, the diameter of the end plates, and any inter-element gasket discs, and hence the diameter of the paper elements, has had to be less than the internal diameter of the filter housing in order to allow forward flow of solvent along the walls of the housing before flowing radially inwards through the elements, and particularly to allow the reverse flow of dirt which occurs when back-washing the filter units. For back-washing, tapes have to be wrapped around the element to avoid outward bulging of, and potential tearing of, the element.

In other fields, such as in the automotive industry, it has been known to provide annular pleated paper elements (hereinafter referred to as annular, sealed pocket, paper filter elemets) with the pockets which open in the radially inward direction being sealed at their ends by sealing together the end edges of the adjacent pleat walls defining those pockets. The element is then permanently secured at its ends to end plates for use, for example, in a screw-on engine oil filter which is used and then disposed of in total. However, such filter units are much smaller than those used in the dry cleaning process.

In accordance with the present invention, a filter unit comprises a perforate tubular core; an annular, sealed pocket, paper filter element, which is arranged to be removably slid axially onto the core; and sealing means adjacent to each end of the core, each sealing means having an annular gasket for sealing against the adjacent end of the element adjacent to the inner periphery thereof, at least one of the sealing means being removable from the core to allow replacement of the element.

Preferably, at least one of the sealing means has an outer diameter less than that of the element such that the sealing means overlap the adjacent end of the element but leaves the majority of the end of the element unobstructed.

The sealing means at at least one end of the element may be provided by an end wall of the housing, in which the unit will be fitted in use. Preferably, however, both sealing means are provided by end plates, each of which will usually have a central hole to accomodate the conventional collection tube.

The end plates, or other sealing means, do not need to extend across the full radial width of the ends of the filter elements as the pleat seals, which close the ends of the inner pockets, ensure that solvent is not able to bypass around the end edges of the pleats and the gaskets prevent such a bypass flow past the radially inner part of the element. Consequently, an operator may enjoy the cost saving benefits of being able to reuse the filter core and sealing means without having to suffer from the solvent bypass problem inherent in the prior proposal. The sealed pleat construction holds the inner folds of the element closely together at the inner periphery and this assists handling of the elements. It also enables the elements to be stored flat prior to use, expanded to the correct shape for use, and then flattened again for disposal. The ability to do this makes it significantly easier to store new elements and to solve the problem of disposing of a large quantity of used filter elements.

If a series of filter units in accordance with the present invention are stacked upon one another in a filter housing, the filter elements may be made such that they touch or nearly touch the inner wall of the housing since fluid can flow along the channels formed by the open ended outer pleat pockets and pass from the channels of one element to the channels of a neighboring element without being impeded by the end plates or other sealing means, which are of a small enough diameter to allow an annular passage to be formed between themselves and the housing wall. As a result of this, the filter element will have a larger surface area of filtration, through the increase in diameter, and possibly though the provision of extra pleats, than that provided by filter elements used in conventional filter units.

The removable sealing means, when an end plate, may be provided by arranging for this end plate to have lugs which are engageable in respective bayonet slots in the core.

This form of connection may not provide the full contact pressure between the gaskets and elements, but only a connection sufficient for holding the unit together during insertion into, and removal from, a filter housing. The full contact pressure may then be provided when the housing cover is tightened down, e.g. by the collection tube or other tie bar.

If it is intended to use the filter unit of the present invention in arrangements in which two or more filter units are stacked upon one another in the filter housing, one end plate may, on its face remote from the element, be provided with another annular gasket around a central hole for sealing up against an adjacent end plate of the neighboring filter unit, or up against the inner periphery of one end of the element of the neighboring filter unit. In the latter case, one end plate, having annular gaskets on both faces, serves as sealing means for two adjacent filter units. If the one end plate is integral with the core of the filter unit, then the stack of units may be provided with a separate clamp plate (end plate) having an annular gasket to serve as the sealing means at the top of the stack. Even so, there will be a reduction in the number of end plates needed and hence a reduction in the overall cost of the sealing means.

The filter unit may be provided with a prepackaged, removable filter bed which is located around the inside of the core and, e.g., held in position by the end plates. Such a filter bed may contain an homogenous mix of activated carbon granules and/or activated clay granules, or the granule size of the or each component may be arranged so that, when the bed is in the core, the granule size decreases upon moving radially inwards in order to make more effective use of the bed, i.e. the larger of the particles which pass through the filter element are filtered out before the smaller ones. Furthermore, if both types of granule are being used, one type may be positioned radially inwards of the other type, with or without each type having its own gradient of granule size.

The provision of a filter bed in a prepackaged form makes it a relatively clean and simple task to insert or remove one of these beds, and the operator is more likely to use the filter in accordance with the correct operating procedure, i.e. not postpone the changing of the filter bed.

The filter bed may be formed as a hollow cylinder (e.g. having rigid polyurethane end caps) which is slid into the core, or the bed may be flexible, being made with a permeable flexible outer covering containing a loose mass of activated granules. In the latter case, the bed may be made in the form of a rectangular blanket which can be stored flat both before and after use, thereby facilitating pre-use storage and post-use disposal, and which is bent around until two of its opposite edges touch, so that it is in annular form for sliding into the core.

The outer covering may be a woven solvent-resistant fabric and, in order to prevent the filter bed from losing its shape during handling, it may have internal straps or webs, or stitching between opposite faces of the covering.

If it is felt that the filter bed needs some support on its inside, possibly to prevent damage when the assembled filter unit is being slid along a collection tube into the filter housing, a second perforate tubular core may be provided radially inwardly of the outer core, and the filter bed positioned between the two cores.

If a number of filter units are being used in the stacked arrangement in the filter housing, it is possible to have different types of prepackaged filter beds in different ones of the filter units in order to tailor the overall filtration characteristics to suit the operating conditions. For example, in a three stack arrangement, two of the beds could contain an homogenous mix of activated carbon and the other activated clay, having, e.g., a granule size gradient.

The invention will now be described by way of example with reference to the accompanying drawings, in which.

Figure 1:
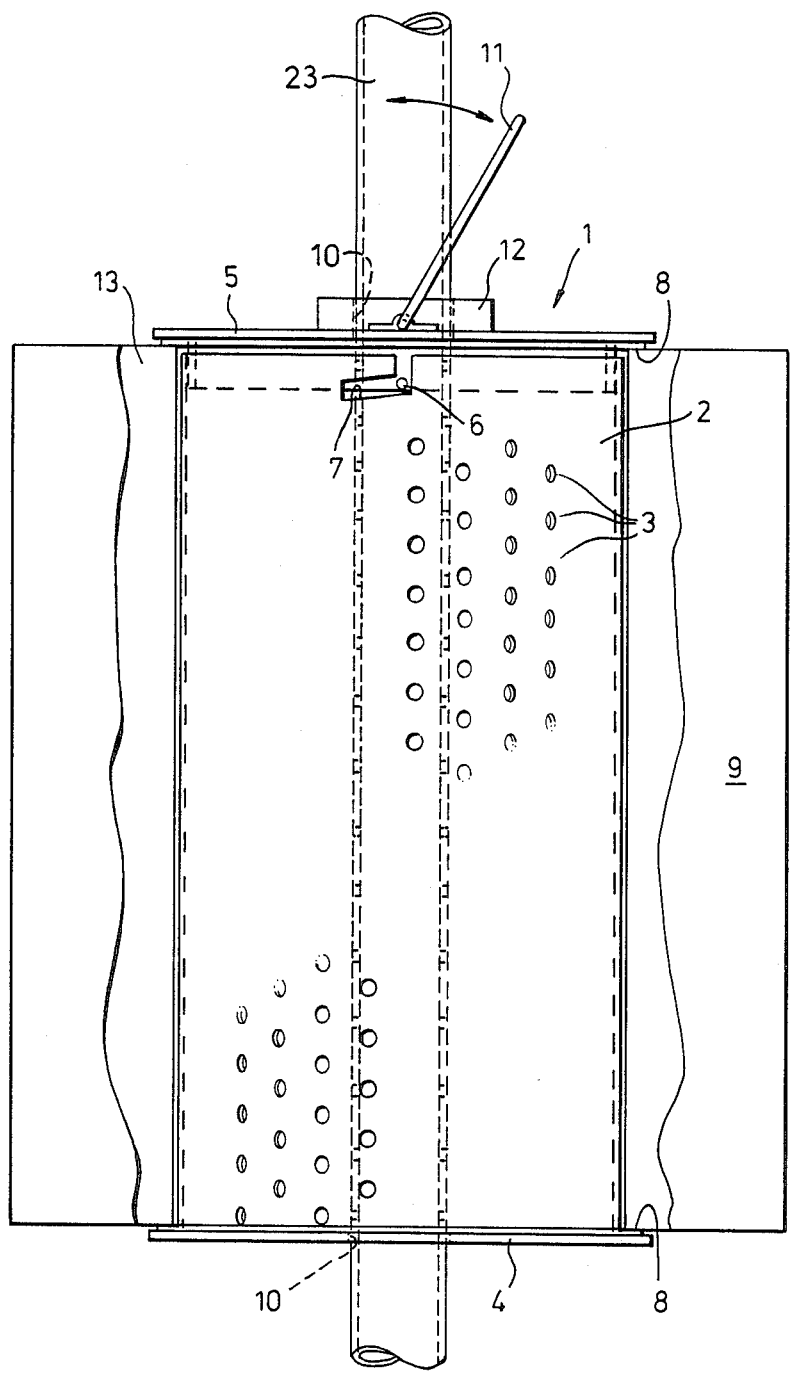
FIG. 1 is a diagrammatic side elevation of a first example of a filter unit in accordance with the present invention.
Figure 2:
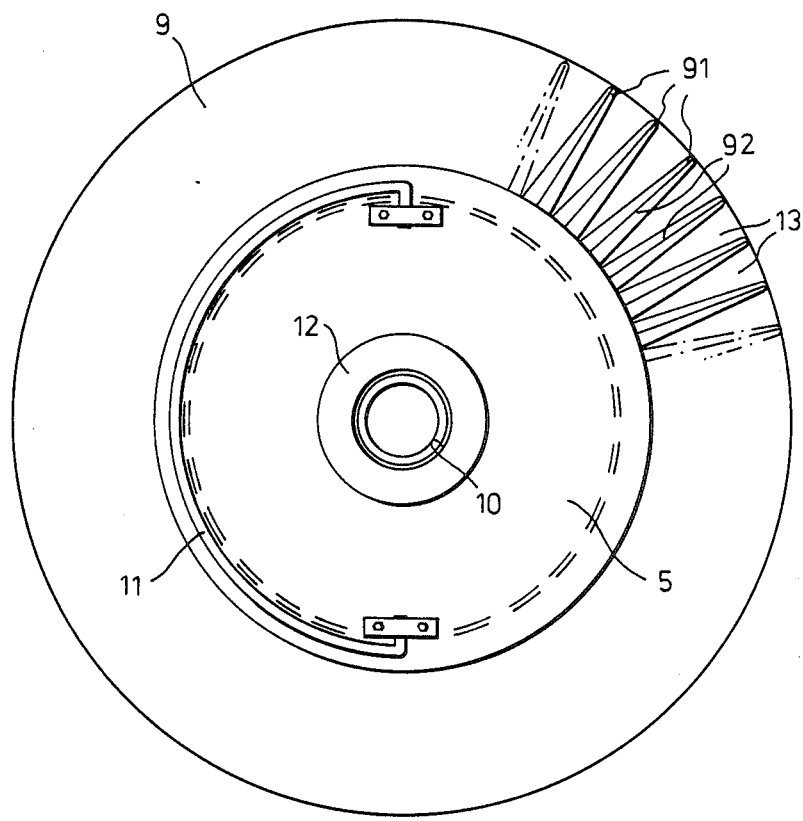
FIG. 2 is a plan of the unit of FIG. 1.

Referring to FIGS. 1 and 2, the filter unit 1 comprises a hollow metal cylindrical core 2 having a large number of perforations 3, only some of which are shown. An end plate 4 is fixed to the bottom of the core 2 and another end plate 5 is removably attachable to the top of the core 2. The plate 5 has a pair of diametrically opposed lugs 6 which can be engaged in a bayonet fashion with a pair of slots 7 in the top of the core 2. The plates 4,5 are slightly wider than the core 2 and the resulting flange-like portions carry circular gaskets 8 on their inward facing surfaces.

With the end plate 5 removed, an annular paper filter element 9 can be slid over the core 2 until it abuts against the end plate 4. The filter element 9 is pleated and the adjacent individual pleat walls 91 defining the inwardly facing pockets are sealed by seals 92 at their end edges. When the end plate 5 is fitted to the top of the core 2, the two seals 8 press against the radially innermost parts of the pleat walls to ensure that all of the fluid being cleaned must pass through the filter element 9, instead of some of the fluid bypassing the element 9 by flowing between the element 9 and end plates 4,5 directly into the interior of the core 2.

The flexibility of the folds of the pleats 9 enables the paper element 9 to be stored flat prior to and after use, thereby minimizing the storage volume. Immediately prior to use, the filter element 9 is brought to the correct cylindrical shape.

The filter unit may be used with a prepackaged filter bed (not shown) which is inserted inside the core 2 prior to the end plate 5 being fitted. This filter bed is, preferably, in the form of a rectangular slab or blanket comprising a fabric covering containing activated granules. The slab may be stored flat prior to use and then bent into annular shape and slid into the perforate core 2. Therefore, when assembled and in use, the fluid flows radially inwards through the filter element 9, the perforations 3 and filter bed, prior to being collected in a collection tube 23 which passes through holes 10 in the center of the plates 4,5.

A pivoted handle 11 is provided on the end plate 5 in order to facilitate handling of the assembled filter unit. In particular, the handle 11 makes it easier to extract the filter unit from the filter housing.

A resilient sealing gasket 12 is provided around the hole 10 in the end plate 5 so that, if several filter units are being stacked upon one another in the filter housing, the end plates of adjacent units can be sealed to one another to prevent fluid from passing directly into the collection tube 23.

Also, even though the filter elements have been designed to touch the inner wall of the filter housing, there is, as is apparent from FIG. 2, no impediment to axial flow along the housing around the unit as the dirty fluid can pass in channels 13 formed by the outer pleat pockets 91 and, if there is a stacked arrangement in the housing, will not be prevented from flowing along the entire length of the housing by the end plates.

Figure 3:
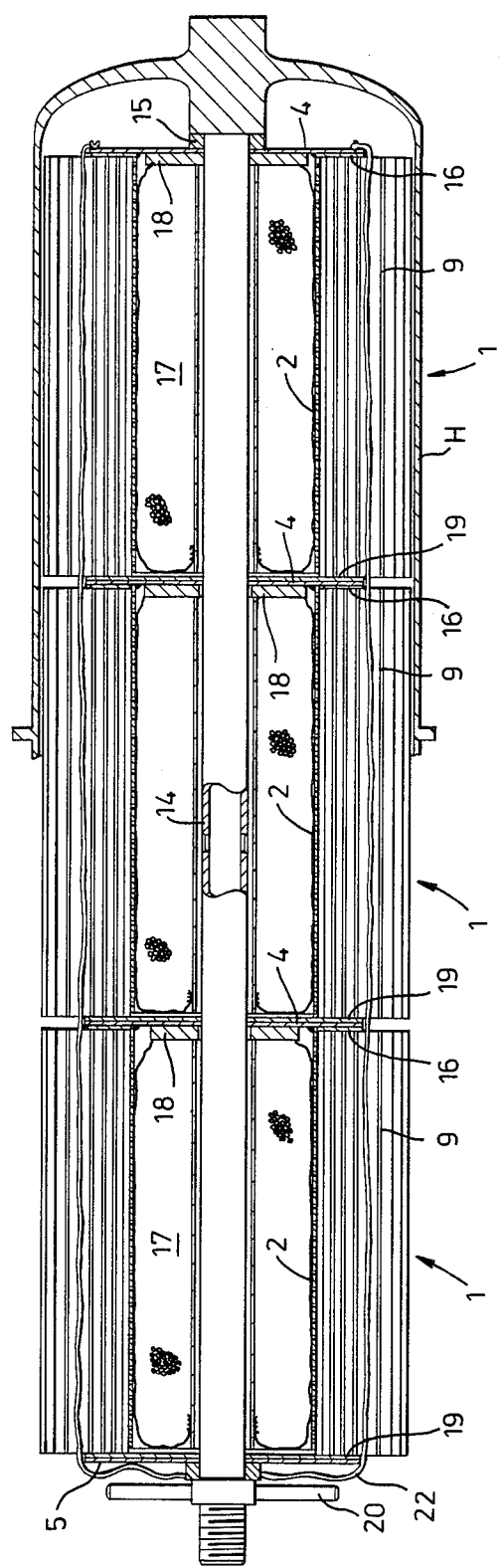
FIG. 3 is a diagrammatic side elevation of a stack of filter units of an alternative design in accordance with the present invention.

FIG. 3 shows a stack of filter units 1, each having a core 2 and end plate 4 fixed thereto as in the example shown in FIGS. 1 and 2; the filter element 9 of each unit 1 is also similar to that of the earlier example.

The major difference is that the middle and right hand units 1 are not provided with their own removable end plates; instead, they make use of the fixed end plates 4 of the adjacent left hand and middle filter units 1 respectively. The left hand filter unit 1, being at the 'top' of the stack, does require an end plate (clamp plate) 5.

The overall construction will be more apparent from the following description of how the stack is assembled.

A housing H (partly shown) has a perforate collection tube 14 rigid and coaxial therewith. A first integral core 2 and end plate 4 are slid along the tube 14 until they abut against a resilient gasket 15. A narrow felt gasket 16 and a filter element 9 are then slid around the core 2 and a prepackaged filter bed 17 having an end cap 18 is slid inside the core 2. The filter element 9 is longer than the core 2, so that, when a wide felt gasket 19 is placed on the exposed end of the element 9, the gasket 19 is not held away from the exposed end, which needs sealing.

A second and third integral core 2 and end plate 4 are then assembled onto the collection tube as outlined above. In this way, the end plate 4 of the middle unit 1 also serves as a removable end plate for the right hand unit 1 so as to seal the ends of the filter element 9 of that unit against its two gaskets 16,19.

The clamp plate 5 is provided to support the wide gasket 19 at the left hand end of the left hand unit 1 and to apply sealing pressure, via a clamp handle 20 screw threadedly wound along the collection tube 14 into abutment through a resilient gasket 21 with the clamp plate 5, to compress the entire stack and thereby seal the ends of all three filter elements 9 against their felt gaskets 16,19.

To disassemble the stack, the clamp handle 20 is wound off the collection tube 14 and a removal cord 22 attached to the fixed end plate 4 of the right hand unit 1 is pulled.

I claim:

1. Filter apparatus comprising:
   a housing defining a chamber with an imperforate cylindrical peripheral wall and a fluid inlet at one axial end;
   at least one filter unit comprising a perforate tubular core; an annular, pleated, paper filter element adapted to be removably slid axially onto and around said core, said filter element having first and second axial ends, said filter element comprising walls wherein adjacent walls are joined by an outer, longitudinal edge thereby forming a pleat, adjacent walls of each pleat being sealed together at said axial ends to form a plurality of sealed pockets; and sealing means adjacent to each end of said core, each of said sealing means comprising an end plate with an annular gasket for sealing against the adjacent end of said element adjacent to the inner periphery thereof, at least one of said sealing means being removable from said core to allow replacement of said element and at least one of said sealing means having an outer diameter less than that of said element; and
   said filter unit being located inside said chamber of said housing around a perforate collection tube therein with said outer, longitudinal edges of said walls of said pleats substantially touching said peripheral wall thereof, and with said one sealing means being adjacent to said inlet whereby fluid can flow axially between and radially outside said pockets of said element and hence through said pleat walls, said pockets and said core to said collection tube.

2. A filter unit according to claim 1, further comprising a prepackaged filter bed adapted to be removably slid axially inside said core.

3. A filter unit according to claim 2, wherein said filter bed contains activated carbon granules.

4. A filter unit according to claim 3, wherein said carbon granules decrease in size in the radially inward direction.

5. A filter unit according to claim 2, wherein said filter bed contains activated clay granules.

6. A filter unit according to claim 5, wherein said clay granules decrease in size in the radially inward direction.

7. A filter unit according to any one of claims 2 to 6, wherein said filter bed is in the shape of a hollow cylinder.

8. A filter unit according to any one of claims 2 to 6, wherein said filter bed is in the form of a flexible rectangular blanket bent around to bring two opposite edges into contact.

9. Filter apparatus according to claim 1, wherein both of said sealing means have an outer diameter less than that of said element.

10. Filter apparatus according to claim 9, wherein each of said end plates defines a central hole for accommodating said collection tube.

11. Filter apparatus according to claim 1, comprising two of said filter units disposed axially in series within said housing, and wherein said sealing means at adjacent core ends of said two filter units comprise a single end plate having said annular gaskets associated with said adjacent core ends on respective faces thereof, said single end plate and said two annular gaskets having outer diameters less than those of said elements of said two filter units.

12. Filter apparatus according to claim 1, comprising two of said filter units disposed axially in series within said housing and wherein said sealing means located axially between said two units have an outer diameter less than that of said elements to allow some fluid to flow from said inlet axially past said element of one of said units to said element of the other of said units.

* * * * *